US009002219B2

(12) United States Patent
Onishi

(10) Patent No.: US 9,002,219 B2
(45) Date of Patent: Apr. 7, 2015

(54) DEVELOPING APPARATUS AND IMAGE FORMING APPARATUS

(71) Applicants: Kabushiki Kaisha Toshiba, Tokyo (JP); Toshiba TEC Kabushiki Kaisha, Tokyo (JP)

(72) Inventor: Kei Onishi, Shizuoka (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/075,200

(22) Filed: Nov. 8, 2013

(65) Prior Publication Data

US 2014/0126921 A1 May 8, 2014

(30) Foreign Application Priority Data

Nov. 8, 2012 (JP) ................................ 2012-246121

(51) Int. Cl.
*G03B 15/08* (2006.01)
*G03G 15/08* (2006.01)
*G03G 15/00* (2006.01)

(52) U.S. Cl.
CPC ........ *G03G 15/0849* (2013.01); *G03G 15/0877* (2013.01); *G03G 15/553* (2013.01)

(58) Field of Classification Search
USPC ............................................................ 399/30
See application file for complete search history.

(56) References Cited

U.S. PATENT DOCUMENTS 4,974,025 A * 11/1990 Kikuchi .......................... 399/63
5,218,407 A * 6/1993 Matsushita et al. ............. 399/29
5,227,847 A * 7/1993 Motohashi et al. ............. 399/27
5,253,020 A * 10/1993 Matsushita et al. ............. 399/30
5,548,385 A * 8/1996 Takai et al. ..................... 399/62
5,619,312 A * 4/1997 Hatano et al. ................... 399/61
2011/0255888 A1* 10/2011 Itoyama et al. ................. 399/30
2011/0262155 A1* 10/2011 Hinoue et al. .................. 399/30
2012/0009518 A1* 1/2012 Nagayama et al. ........ 430/124.1
2012/0148267 A1* 6/2012 Kawai ............................... 399/8

FOREIGN PATENT DOCUMENTS

JP 4363083 B2 11/2009

* cited by examiner

*Primary Examiner* — Rodney Fuller
(74) *Attorney, Agent, or Firm* — Patterson & Sheridan, LLP

(57) ABSTRACT

A developing apparatus includes a development unit configured to supply toner to a photoconductor on which an electrostatic image is formed, a supply unit configured to supply toner to the development unit, a sensor configured to detect a concentration of toner in the development unit, and a control unit. The control unit is configured to, when the detected concentration of the toner is lower than a first value, control the supply unit to perform a toner supply process, control the sensor to detect the concentration of the toner after the toner supply process, count the number of times the sensor detects the concentration of the toner to be higher than a second value that is higher than the first value, and control the supply unit to repeat the toner supply process, when the counted number is less than a predetermined number that is equal to or greater than two.

20 Claims, 3 Drawing Sheets

DEVELOPING APPARATUS AND IMAGE FORMING APPARATUS

CROSS-REFERENCE TO RELATED APPLICATION

This application is based upon and claims the benefit of priority from Japanese Patent Application No. 2012-246121, filed Nov. 8, 2012, the entire contents of which are incorporated herein by reference.

FIELD

Embodiments described herein relate to a developing apparatus and an image forming apparatus including the same.

BACKGROUND

In an electrophotographic image forming apparatus (e.g., a multi-functional peripheral), an image is obtained by developing a latent image formed on a photoconductor with toner supplied from a development device and transferring the toner image to a medium (e.g., a sheet of paper or a resin sheet). Typically, when the toner is consumed for such developing, new toner is supplied to the development device. Toner in the development device is circulated in the development device to prevent uneven distribution of the toner, during image forming operations.

A concentration of the toner in the development device is detected by a toner concentration sensor provided in the development device. When the detected concentration of the toner in the development device is below a predetermined level, the print operation is suspended and a toner supply operation is carried out to prevent decrease in print quality or other problems such as carrier adhesion. If the toner in the development device is not sufficiently distributed therein, the toner concentration sensor can make an inaccurate detection, which leads to termination of the toner supply operation even though the concentration of the toner in the development device has not returned to a sufficient level for printing.

DETAILED DESCRIPTION

In general, according to one embodiment, a developing apparatus includes a development unit configured to supply toner to a photoconductor on which an electrostatic image is formed, a supply unit configured to supply toner to the development unit, a sensor configured to detect a concentration of toner in the development unit, and a control unit. The control unit is configured to, when the detected concentration of the toner is lower than a first value, control the supply unit to perform a toner supply process, control the sensor to detect the concentration of the toner after the toner supply process, count the number of times the sensor detects the concentration of the toner to be higher than a second value that is higher than the first value, and control the supply unit to repeat the toner supply process, when the counted number is less than a predetermined number that is equal to or greater than two.

Figure 1:
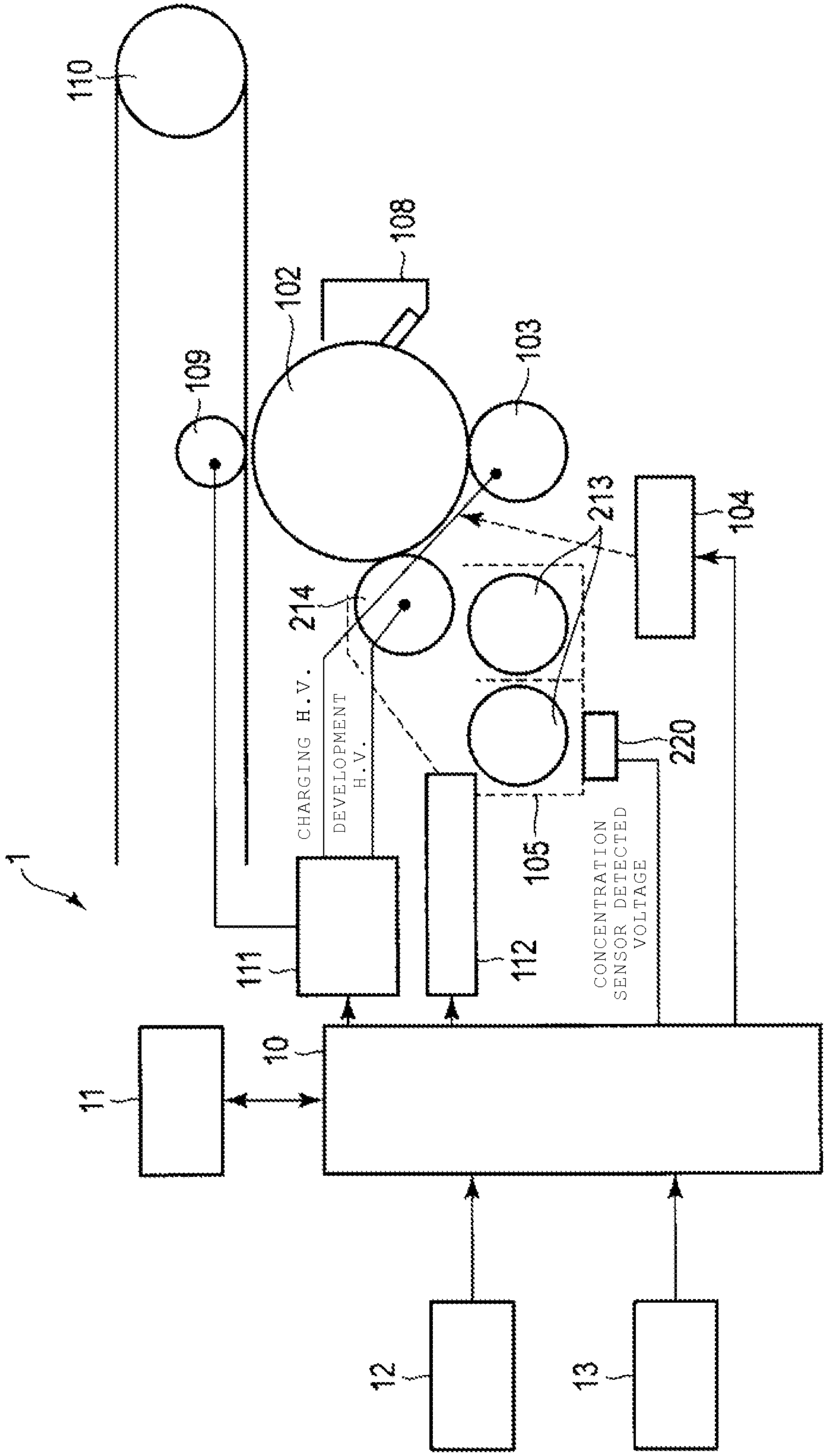
FIG. 1 is a diagram showing a configuration of units related to toner supply and a control system in an image forming apparatus according to an embodiment.

FIG. 1 is a diagram showing the configuration of units related to toner supply and a control system in an image forming apparatus according to an embodiment.

An image forming apparatus 1 includes a control unit 10, a photoconductor 102, a charge device 103, an exposure device 104, a development device 105, a cleaning device 108, a primary transfer device 109, a transfer belt device 110, a high-voltage power supply 111, and a toner supply device 112. The development device 105 includes stirring mixers 213, a development sleeve 214, and a toner concentration sensor 220.

The photoconductor 102 rotates in a sub-scanning direction that is a circumferential direction of the photoconductor 102. In the vicinity of the photoconductor 102, the charge device 103 is disposed. The charge device 103 uniformly charges the surface of the photoconductor 102 with a charging voltage supplied from the high-voltage power supply 111.

In the exposure device 104, a semiconductor laser source is turned on and off corresponding to an image signal, while a laser light emitted from the semiconductor laser source is deflected. A direction of the laser light emitted from the semiconductor laser is turned by a deflector such as a polygon mirror in a main scanning direction that corresponds to a direction of the rotation axis of the photoconductor 102. Then, the laser light is projected on the photoconductor 102 through an optical system such as a lens. When the laser light is projected on the charged photoconductor 102, an illuminated region is reduced in potential, and an electrostatic latent image is formed in the illuminated region.

A developer layer including toner is formed on the development sleeve 214, and the toner on the development sleeve is supplied to a position of the photoconductor 102 at which the photoconductor 102 faces the development sleeve 214, that is, a development position.

The toner supply device 112 is detachably provided and configured to supply the toner to the development device 105.

The primary transfer device 109 is provided corresponding to a transfer position of the photoconductor 102, and a toner image is formed on a transfer belt of the transfer belt device 110. A medium supplied from a paper tray is transported to the transfer position. The toner image on the transfer belt is transferred to the medium with a secondary transfer device (not shown). The medium to which the toner image has been transferred is transported to a fixing device (not shown). The toner image is fixed onto the medium by application of heat and pressure. Then the medium to which the toner image has been fixed is discharged.

After the transfer of the toner image to the medium is finished, a residual toner remaining on the photoconductor 102 is removed by the cleaning device 108. The photoconductor 102 returns to an initial state to be in wait for the next image formation.

The above process operations are repeated, and thus the image formation operations are continuously performed.

The development device 105 is provided with the stirring mixers 213 and the development sleeve 214. The stirring mixers 213 stir the toner supplied from the toner supply device 112 and supply the toner to the development sleeve 214, from which the toner is transferred to the photoconductor 102. As a development high voltage is applied to the development sleeve 214, the toner on the development sleeve 214 is transferred onto an electrostatic latent image on the photoconductor 102 due to reversal phenomena.

The development sleeve 214 and the stirring mixers 213 are mechanically connected (mechanically tied) and driven together by a development motor (not shown). On the other hand, the photoconductor 102 is driven by another motor (not shown). These motors are operated based on drive commands from the control unit 10.

The development device 105 is provided with the toner concentration sensor 220 for detecting a concentration of the toner in a development container. The toner concentration sensor 220 outputs a measurement signal (detection voltage) corresponding to the amount of the toner remaining in the development container. Then, based on the output from the toner concentration sensor 220, the toner supply device 112 is controlled to supply the toner into the development container.

The control system of the image forming apparatus 1 includes the control unit 10, a control panel 11, a memory 12, and a scanner 13.

The control panel 11 constitutes an instruction input unit for instructing operations of the image forming apparatus 1 such as the start of image formation and the start of reading of an image on a document by a scanning operation. The memory 12 stores a table and information for controlling a toner supply operation and a forcible supply operation. The scanner 13 scans a surface of a document to convert it to image data.

Next, the configuration and operation of the development device 105 will be described.

Figure 2:
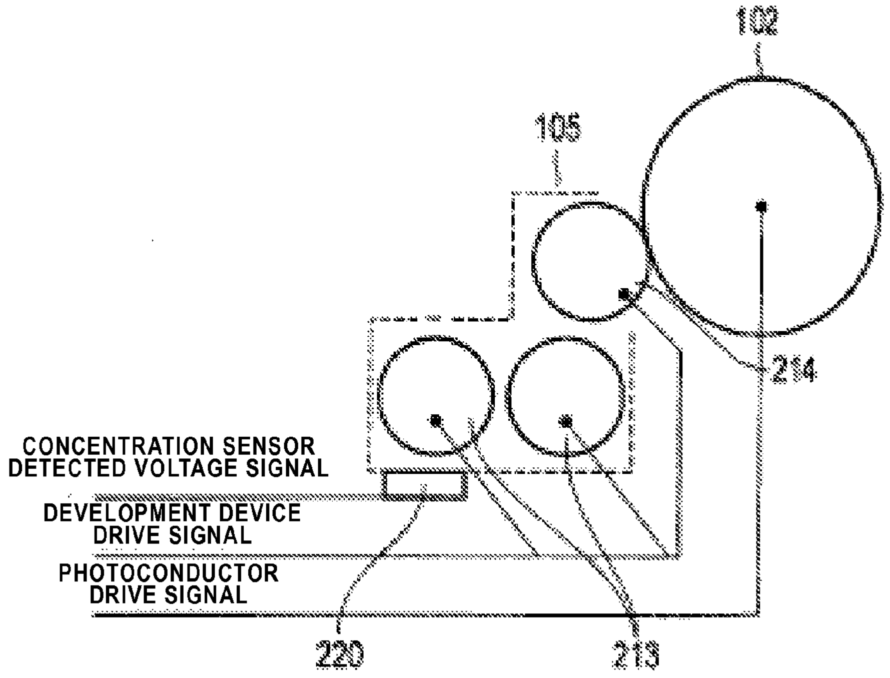
FIG. 2 is a diagram showing the schematic configuration of a development device in the image forming apparatus according to the embodiment.

FIG. 2 is a diagram showing a schematic configuration of the development device 105 in the image forming apparatus 1 according to the embodiment. The development device 105 includes the stirring mixers 213 and the development sleeve 214. The stirring mixers 213 stir the toner supplied from the toner supply device 221, and supply the toner to the development sleeve 214, from which the supplied toner is transferred to the photoconductor 102. According to a development device drive signal output from the control unit 10, the stirring mixers 213 and the development sleeve 214 rotate synchronously. According to a photoconductor drive signal output from the control unit 10, the photoconductor 102 rotates.

The development device 105 is provided with the toner concentration sensor 220. The toner concentration sensor 220 is a magnetic sensor, and outputs the magnetic permeability of the developer as a voltage. The magnetic permeability of the developer is in correspondence with the concentration of the toner in the development container. Therefore, the toner concentration sensor 22 outputs a measurement signal corresponding to the concentration of the toner in the development container as a voltage signal. Then, in response to the output from the toner concentration sensor 220, the toner supply device 112 is controlled to supply the toner into the development container. Specifically, according to a toner supply control signal, the toner is supplied from the toner supply device 221 into the development container for a period of time corresponding to the measurement signal of the toner concentration sensor 220 indicating the amount of remaining toner.

In the embodiment, the two-component developer formed of a mixture of the toner and a magnetic carrier is used, so that the toner concentration sensor 220 can detect the concentration of the toner in the development container based on the magnetic permeability of the developer including the magnetic carrier. When a general developer is used, a sensor capable of directly measuring the toner level and the toner concentration in the development container is used.

Figure 3:
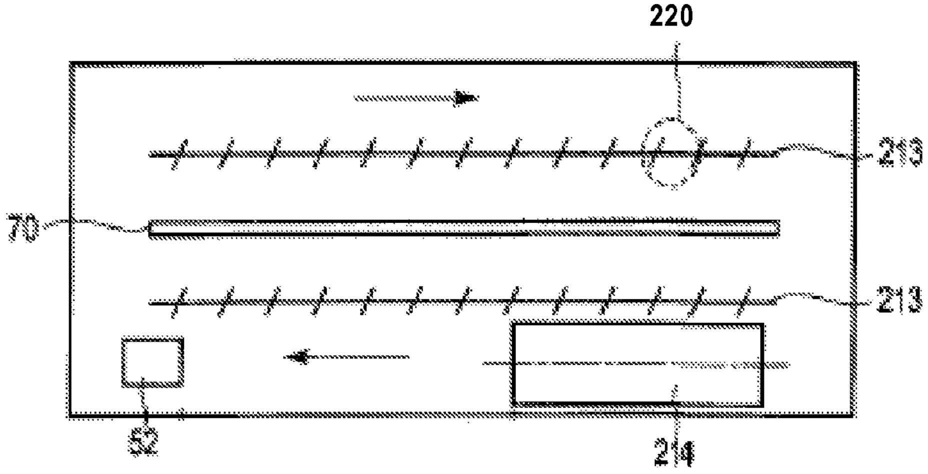
FIG. 3 is a cross-sectional view showing an arrangement of units in a development container of the development device in the image forming apparatus according to the embodiment.

FIG. 3 is a cross-sectional view showing an arrangement of units inside the development container of the development device in the image forming apparatus of the embodiment.

In the development container of the development device 105, the two stirring mixers 213 are disposed with a partition plate 70 being interposed therebetween. A toner supply port 52 is disposed in an upper portion of the development container. The toner transported from the toner supply device 112 falls through the toner supply port 52 into the development container to be supplied. The development sleeve 214 is provided upstream with respect to the toner supply port 52 in a direction in which the toner is conveyed.

The development sleeve 214 is provided rotatably in the development container. The toner on the development sleeve 214 is transferred to an electrostatic latent image formed on the photoconductor 102 and forms a toner image. The stirring mixers 213 each has augers. By a rotation of the stirring mixers 213, the developer (toner and a carrier) in the development container is conveyed in the directions of arrows in FIG. 3 and circulates in the development container with being mixed. That is, the toner supplied through the toner supply port 52 circulates in the development container to be supplied to the development sleeve 214.

Here, the toner concentration sensor 220 is provided at the outer surface of the development container. The toner concentration sensor 220 measures the magnetic permeability of the developer while the supplied toner and the magnetic carrier are stirred. As described above, a reduction in size of development devices in recent years results in an insufficient space for stirring and dispersing the supplied toner in a developer. Consequently, a developer insufficiently stirred and having a locally high concentration of the toner may be measured, so that a forcible supply operation may be terminated even though the concentration of the toner in the developer, with a sufficient stirring, is not returned to a printable level.

Figure 4:
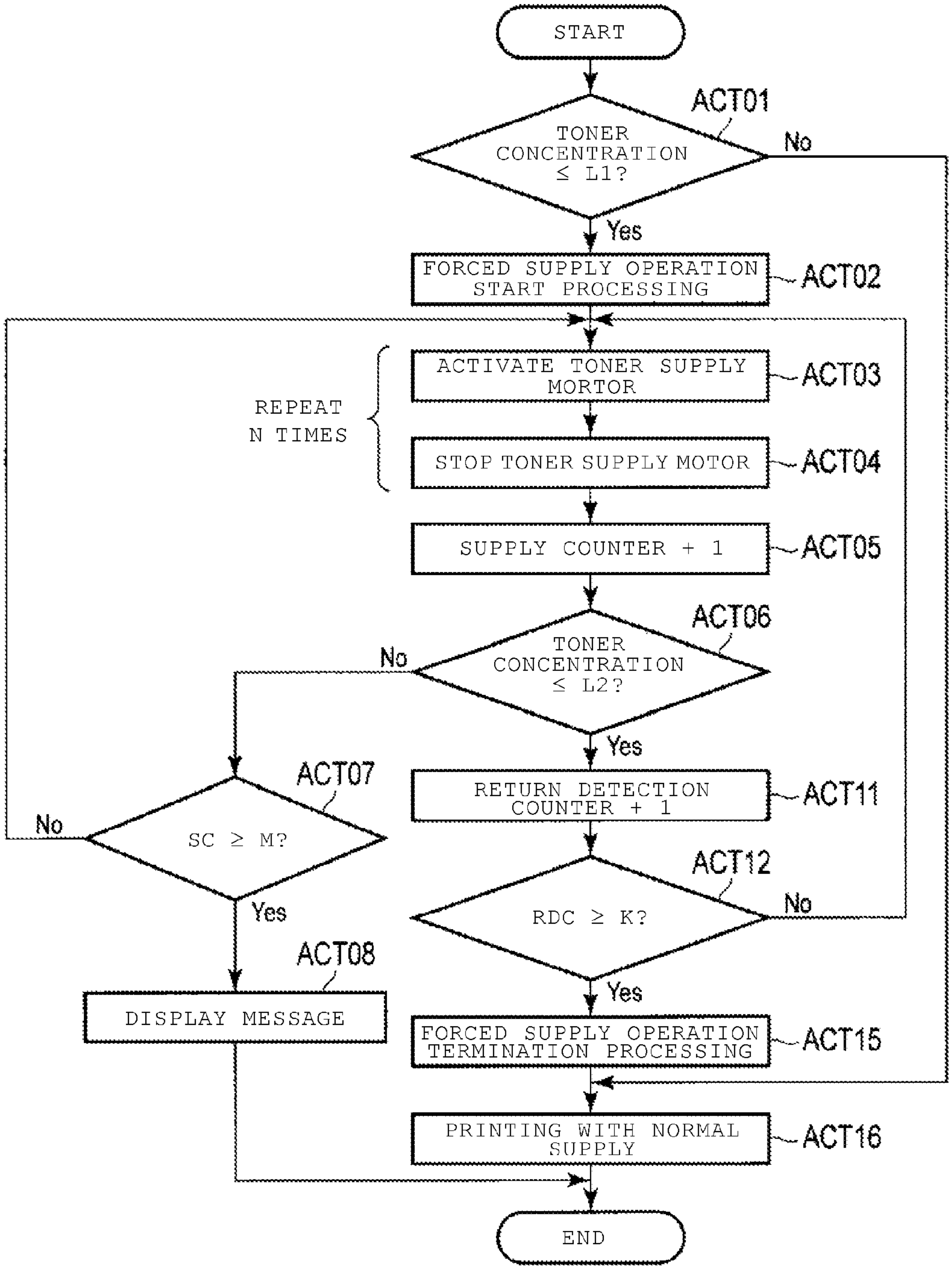
FIG. 4 is a flow chart showing a forcible supply procedure carried out in the image forming apparatus according to the embodiment.

FIG. 4 is a flow chart showing a procedure of a forcible supply carried out in the image forming apparatus according to the embodiment. This procedure is centrally controlled by the control unit 10.

The control unit 10 receives a voltage output from the toner concentration sensor 220 at a predetermined time during a normal printing operation. In ACT 01, the control unit 10 determines whether the concentration of the toner is below a forcible supply level L1, at which normal printing may not be continued. If the toner concentration is not below the forcible supply level L1 (NO in ACT 01), in ACT 16, the printing operation is executed with a normal supply of the toner.

If the detected toner concentration is below the forcible supply level L1 (YES in ACT 01), the printing operation is suspended and start processing of a forcible supply operation is carried out, in ACT 02. The control unit 10 performs, in initial processing of the forcible supply operation, sets a number of supply counter SC as 0 and a number of return detection counter RDC as 0.

In ACT 03, the toner supply motor is operated for "a" seconds to supply toner from the toner supply device 112 to the development device 105. In ACT 04, the toner supply motor is stopped for "b" seconds and the supplied toner is stirred. After the operating and stopping of the toner supply motor are repeated a predetermined number of times N (an integer equal to or greater than 1), the number of the supply counter SC is incremented by 1 (1 increment) corresponding to N times of operating and stopping of the toner supply motor as a single supply operation, in ACT 05.

In ACT 06, the control unit 10 receives a voltage output from the toner concentration sensor 220, and determines whether or not the toner concentration is above a return level L2, which is a level at which normal printing can be continued. Here, the return level L2 is greater than the forcible supply level L1.

If the detected toner concentration is above the return level L2 (YES in ACT 06), the number of the return detection counter RDC is incremented by 1 (1 increment) in ACT 11. In ACT 12, it is determined whether the number of return detection counter RDC is equal to or greater than a set value K. When the return detection counter RDC is smaller than the set value K (an integer equal to or greater than 2) (NO in ACT 12), the process returns to ACT 03 and the subsequent actions are repeated.

If the number of return detection counter RDC is equal to or greater than the set value K (YES in ACT 12), termination processing of the forcible supply operation is executed in ACT 15. That is, the normal supply operation is ready to be carried out. Then, in ACT 16, the printing operation with the normal supply is performed.

On the other hand, if the detected concentration of the toner is lower than the return level L2 (No in ACT 06), it is determined whether the number of supply counter SC is equal to or greater than M (an integer equal to or greater than 3) in ACT 07. If the number of supply counter SC is smaller than M (NO in ACT 07), the process returns to ACT 03 and the subsequent actions are repeated.

If the number of supply counter SC is equal to or greater than M (i.e., the forcible supply operation is executed M times) (Yes in ACT 07), it is determined that the toner cartridge with the corresponding color is empty, and a message indicating toner empty is displayed on the control panel 11 in ACT 08. Then, the process is terminated.

According to the flowchart shown in FIG. 4, the forcible supply operation is continued until the return level L2 is detected the predetermined number of times (K), and thus a sufficient amount of toner is more reliably supplied to the development device 105. Moreover, as shown in the flow chart, the number of return detection counter RDC need not be incremented with respect to each of the operating and stopping of the toner supply motor until the number reaches the predetermined number of times (K). Furthermore, if the empty return level is not detected the predetermined number of times (K) even when the forcible supply operation reaches the predetermined number of times (M), it is determined that the toner cartridge with the corresponding color is empty, and the process is terminated.

The parameters used in the forcible supply operation, such as the forcible supply level L1, the return level L2, the supply number of times counter SC, the return detection number of times counter RDC, the predetermined numbers of times N, K, and M, are stored in the memory 12. The values of these parameters are changeable with the control panel 11.

In the embodiment, the predetermined number of times N is a fixed value, but it may be a variable value. For example, the value of the predetermined number of times N can be decreased in response to an increase in the number of the return detection counter RDC. As the number of the return detection counter RDC increases, a larger amount of the toner is possibly refilled. Thus, the amount of toner to be supplied can be reduced, and the forcible supply operation can be completed earlier.

The respective functions described in the embodiment may be configured using hardware, or may be implemented using software with programs from which the functions are read out into a computer. Alternatively, the respective functions may be configured by selecting either software or hardware for each as appropriate.

Moreover, the respective functions may be implemented by reading programs stored in a storage medium not shown into a computer. Here, a storage medium in the embodiment may have any form in its recording format as long as it can store programs and is computer readable.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A developing apparatus, comprising:
a development unit configured to supply toner to a photoconductor on which an electrostatic image is formed;
a supply unit configured to supply toner to the development unit;
a sensor configured to detect a concentration of toner in the development unit; and
a control unit configured to, in response to the detected concentration of the toner being lower than a first value:
control the supply unit to perform a toner supply process,
control the sensor to detect the concentration of the toner after the toner supply process,
count the number of times the sensor detects the concentration of the toner to be higher than a second value that is higher than the first value, and
control the supply unit to repeat the toner supply process, when the counted number is less than a predetermined number that is equal to or greater than two.

2. The developing apparatus according to claim 1, wherein the control unit is further configured to
control the supply unit to stop the toner supply process, when the counted number is greater than the predetermined number.

3. The developing apparatus according to claim 1, wherein the control unit is further configured to
count the number of times the toner supply process has been performed, and
cause a display to show information, when the counted number of times the toner supply process has been performed is greater than a predetermined number and the detected concentration of the toner is lower than the second value.

4. The developing apparatus according to claim 1, wherein the control unit is further configured to
count the number of times the toner supply process has been performed, and
control the supply unit to repeat the toner supply process, when the counted number of times the toner supply process has been performed is less than a predetermined number and the detected concentration of the toner is lower than the second value.

5. The developing apparatus according to claim 1, wherein the toner supply process includes a predetermined number of sub-processes, in each of which the supply unit supplies the toner to the development unit for a first period of time and then the development unit circulates the supplied toner therein for a second period of time.

6. The developing apparatus according to claim 5, wherein the predetermined number of the sub-processes corresponds to the number of times the sensor detects the concentration of the toner to be higher the second value.

7. The developing apparatus according to claim 1, further comprising:

a memory unit configured to store the first value, the second value, and the predetermined number.

8. The developing apparatus according to claim 1, wherein a control unit is further configured to control the development unit not to supply the toner to the photo conductor until the counted number reaches the predetermined number, when the detected concentration of the toner is lower than the first value.

9. A method for controlling an image forming apparatus, including a development unit configured to supply toner to a photoconductor on which an electrostatic image is formed, a supply unit configured to supply toner to the development unit, and a sensor configured to detect a concentration of toner in the development unit, the method comprising:

controlling the supply unit to perform a toner supply process, when the detected concentration of the toner is lower than a first value;

controlling the sensor to detect the concentration of the toner after the toner supply process;

counting the number of times the sensor detects the concentration of the toner to be higher than a second value that is higher than the first value; and controlling the supply unit to repeat the toner supply process, when the counted number is less than a predetermined number that is equal to or greater than two.

10. The method according to claim 9, further comprising: controlling the supply unit to stop the toner supply process, when the counted number is greater than the predetermined number.

11. The method according to claim 9, further comprising: counting the number of times the toner supply process has been performed; and causing a display to show information, when the counted number of times the toner supply process has been performed is greater than a predetermined number and the detected concentration of the toner is lower than the second value.

12. The method according to claim 9, further comprising: counting the number of times the toner supply process has been performed; and controlling the supply unit to repeat the toner supply process, when the counted number of times the toner supply process has been performed is less than a predetermined number and the detected concentration of the toner is lower than the second value.

13. The method according to claim 9, wherein the toner supply process includes a predetermined number of sub-processes, in each of which the supply unit supplies the toner to the development unit for a first period of time and the development unit circulates the supplied toner therein for a second period of time.

14. The method according to claim 13, wherein the predetermined number of the sub-processes corresponds to the number of times the sensor detects the concentration of the toner to be higher the second value.

15. The method according to claim 9, further comprising: storing the first value, the second value, and the predetermined number.

16. The method according to claim 9, further comprising: controlling the development unit not to supply the toner to the photo conductor until the counted number of times reaches the predetermined number, when the detected concentration of the toner is lower than a first value.

17. An image forming apparatus, comprising:

a photoconductor configured to carry an electrostatic image;

a development unit configured to supply toner to the photoconductor;

a transfer unit configured to transfer the toner on the photoconductor to a medium;

a supply unit configured to supply toner to the development unit;

a sensor configured to detect a concentration of toner in the development unit; and a control unit configured to, in response to the detected concentration of the toner being lower than a first value:

control the supply unit to perform a toner supply process, control the sensor to detect the concentration of the toner after the toner supply process, count the number of times the sensor detects that the concentration of the toner to be higher than a second value that is higher than the first value, and control the supply unit to repeat the toner supply process, when the counted number is less than a predetermined number that is equal to or greater than two.

18. The image forming apparatus according to claim 17, wherein the control unit is further configured to control the supply unit to stop the toner supply process, when the counted number is greater than the predetermined number.

19. The image forming apparatus according to claim 17, wherein the control unit is further configured to count the number of times the toner supply process has been performed, and cause a display to show information, when the counted number of times the toner supply process has been performed being greater than a predetermined number and the detected concentration of the toner is lower than the second value.

20. The image forming apparatus according to claim 17, wherein the control unit is further configured to count the number of times the toner supply process has been performed, and control the supply unit to repeat the toner supply process, when the counted number of times the toner supply process has been performed is less than a predetermined number of times and the detected concentration of the toner is lower than the second value.

* * * * *